United States Patent [19]
Watanabe et al.

[11] Patent Number: 6,017,239
[45] Date of Patent: Jan. 25, 2000

[54] ELECTRICAL CONNECTION CONTAINER

[75] Inventors: Tomotaka Watanabe; Kazuo Miyajima; Jutaro Mukai; Masakazu Murakami, all of Tokyo, Japan

[73] Assignee: The Furukawa Electric Co., Ltd., Tokyo, Japan

[21] Appl. No.: 08/965,504

[22] Filed: Nov. 6, 1997

[30]    Foreign Application Priority Data

| Nov. 6, 1996 | [JP] | Japan | ................................... 8-310146 |
| Nov. 6, 1996 | [JP] | Japan | ................................... 8-310147 |
| Nov. 28, 1996 | [JP] | Japan | ................................... 8-317618 |

[51] Int. Cl.[7] .................................................... H01R 4/24
[52] U.S. Cl. .......................... 439/405; 439/402; 439/404
[58] Field of Search ............................. 439/76.1, 78, 84, 439/405, 404, 82, 76.2, 949, 926, 402

[56]              References Cited

U.S. PATENT DOCUMENTS

| 4,262,984 | 4/1981 | Takahashi | .............................. 339/97 R |
| 5,562,478 | 10/1996 | Yamamoto | ............................... 439/402 |
| 5,782,651 | 7/1998 | Konoya | .................................... 439/405 |

*Primary Examiner*—Paula Bradley
*Assistant Examiner*—Alexander Gilman
*Attorney, Agent, or Firm*—Armstrong, Westerman, Hattori, McLeland & Naughton

[57]                ABSTRACT

An electrical connection container suitable for mounting in a vehicle etc., provided with a plurality of press-fit terminals provided with engagement projections bent in directions perpendicular to the plane including press-fitting portions, whereby the pitch between the terminal portions may be reduced while securing an insulating distance and therefore the electrical connection container can be made smaller. Wire pressing ribs are provided projecting out from the bottom surface of a subplate so as to press the wires and press-fit them in the press-fitting portions of the press-fitting portions, at which time the wire pressing ribs push the wires riding above the spaces between protective walls into the space between the protective walls and thereby ensure stability of the electrical connection while keeping the wires substantially straight. Further, wires press-fit to the wire press-fit portions of the press-fit terminals are cut for each of the circuits and then laid.

21 Claims, 14 Drawing Sheets

ELECTRICAL CONNECTION CONTAINER

BACKGROUND OF THE INVENTION

1. Field of the Invention

The present invention relates to an electrical connection container (an electrical connection box) for laying wires to form circuits therein and to a press-fit terminal for an electrical connection container, more particularly relates to an electrical connection container used for electrical wiring and mounted inside an automobile or other vehicle. Further, the present invention relates to a technique of press-fitting wires at press-fitting portions of press-fit terminals in an electrical connection container to form circuits.

2. Description of the Related Art

In order to reduce the price of electric connection containers (electrical connection boxes) mounted in vehicles etc., recently attempts have been made to provide them with press-fit terminals and press-fit wires there to form circuits in the electrical connection containers. If electrical connection containers are produced by this method, there is an advantage in that it is possible to reduce the cost of the materials and the costs of the processing compared with the method of punching sheets of a conductor into bus-bars by a die. Further, there is the advantage of being able to easily deal with changes when for example modifications are made in the circuit designs.

The disadvantage is that the electrical connection container becomes larger in dimensions. If the electrical connection container becomes larger in dimensions, it suffers from the disadvantage with mounting in the vehicle etc.

Further, if the wires ride above the protective walls protecting the press-fit terminals in the electrical connection container, the wires will end up deviating from their correct positions of connection to the press-fitting portions or the wires will end up connected at an angle with respect to the press-fitting portions and therefore the electrical stability of the connection portions will be impaired.

Further, at the manufacturing stage of electrical connection containers, it has been found that scraps of wires produced when cutting the wires end up being left over in the case or insulating plate etc. and make processes or facilities necessary for their removal. Further, since a large amount of such scrap is produced, use of the wires is uneconomical.

SUMMARY OF THE INVENTION

An object of the present invention is to provide an electrical connection container (an electrical connection box) which can be made smaller in dimensions.

Another object of the present invention is to provide an electrical connection container which improves the stability of the electrical connection of the connection portion.

Still another object of the present invention is to provide an electrical connection container free from the effects of scraps of the wires at the manufacturing stage of the electrical connection container.

Still another object of the present invention is to provide a press-fit terminal which can be used for the above electrical connection container.

According to a first aspect of the present invention, there is provided an electrical connection container comprised of an insulating plate having terminal through holes and press-fit terminals comprised of press-fitting portions for press-fitting and affixing wires laid along the surface of the insulating plate, engagement projections for engaging with the terminal through holes, and terminal portions for insertion through the terminal through holes, formed continuously with each other, the engagement projections projecting out in planes different from the planes of the press-fitting portions, the terminal through holes being formed adjoining each other, the terminal portions passing through the terminal through holes, and the engagement projections being affixed to the terminal through holes.

Preferably, there are further provided an upper case and a lower case accommodating the insulating plate having the press-fit terminals.

According to a second aspect of the present invention, there is provided an electrical connection container comprised of press-fit terminals having press-fitting portions for press-fitting wires laid along the surface of a plate, terminal through holes formed in the plate for insertion and affixing of the press-fit terminals, and a subplate pressed from one side of the plate for press-fitting the wires in the press-fitting portions and having wire pressing ribs for press-fitting and continuing to press the wires against predetermined press-fitting portions.

Preferably, the wire pressing ribs are arranged on the subplate so as to press-fit the wires against press-fitting portions of the press-fit terminals and to be positioned at empty areas of the press-fit terminals at portions where the wires are not press-fit.

More preferably, the plate is formed as a lower case and further comprises an upper case which works with the lower case to accommodate the subplate having the wire pressing ribs.

According to a third aspect of the present invention, there is provided a method for laying wires in an electrical connection container having a plate for laying wires, a plurality of terminal through holes formed in a row in the plate, engagement projections engaged with and affixed to the terminal through holes, terminal portions projecting through the terminal through holes, and press-fitting portions connected to the engagement projections and positioned at a surface of the plate opposite to that of the terminal portions, comprising, for every circuit to be formed in the electrical connection container, cutting wires into predetermined lengths in accordance with the positions of the plurality of press-fitting portions affixed to the terminal through holes in advance and press-fitting the predetermined cut lengths of the wires at the plurality of press-fitting portions.

According to a fourth aspect of the present invention, there is provided a method for laying wires in an electrical connection container having a plate for laying wires, a plurality of terminal through holes formed in a row in the plate, engagement projections engaged with and affixed to the terminal through holes, terminal portions projecting through the terminal through holes, and press-fitting portions connected to the engagement projections and positioned at a surface of the plate opposite to that of the terminal portions, comprising, for every circuit, affixing a series of lengths of wires to the plurality of press-fitting portions affixed to the terminal through holes in advance and cutting the ends of the wires.

According to a fifth aspect of the present invention, there is provided a press-fit terminal for an electrical connection container comprised of a press-fitting portion for press-fitting and affixing a wire laid along the surface of a plate of an electrical connection container, engagement projections for engaging with a terminal through hole formed in the plate, and a terminal portion projecting out through the terminal through hole, formed continuously with each other, the engagement projections projecting out in planes different from the plane of the press-fitting portion.

The engagement projections of the press-fit terminal may be bent in plane substantially perpendicular to the plane of the press-fitting portion. Alternatively, a pair of engagement projections may also be provided at opposite positions on the two sides of the press-fitting portion and be bent in opposite directions. Alternatively, the pair of the engagement projections may be bent in the same direction. Further, the pair of the engagement projections may each be provided with a first portion bent to a plane substantially perpendicular to the plane of the press-fitting portion, a second portion extending from the first portion, substantially perpendicular to the first portion, and substantially parallel to the plane of the press-fitting portion, and a third portion extending from the second portion and bent to be substantially parallel to the first portion.

Further, an intermediate connection portion may be provided between the engagement projections and the terminal portion bent to be substantially perpendicular to the two.

BRIEF DESCRIPTION OF THE DRAWINGS

These and other objects and features of the present invention will become more apparent from the following description of the preferred embodiments with reference to the accompanying drawings, in which:

FIG. 18A is a schematic plane view illustrating the method of laying a wire by press-fitting in press-fitting portions for each circuit and FIG. 18B is a schematic plane view illustrating the method of cutting off unwanted wire parts after laying; and FIG. 19A and FIG. 19B are views of the laying of a wire in an electrical connection container as a second example of the sixth embodiment of the present invention, wherein FIG. 19A is a perspective view of the state of cutting of a wire and FIG. 19B is a perspective view of the press-fitting of the cut wire.

DESCRIPTION OF THE PREFERRED EMBODIMENTS

The preferred embodiments of electrical connection containers (an electrical connection boxes) of the present invention will be explained next with reference to the drawings.

First Embodiment

A first embodiment of an electrical connection container of the present invention will be explained with reference to FIG. 1 to FIG. 3.

Figure 1:
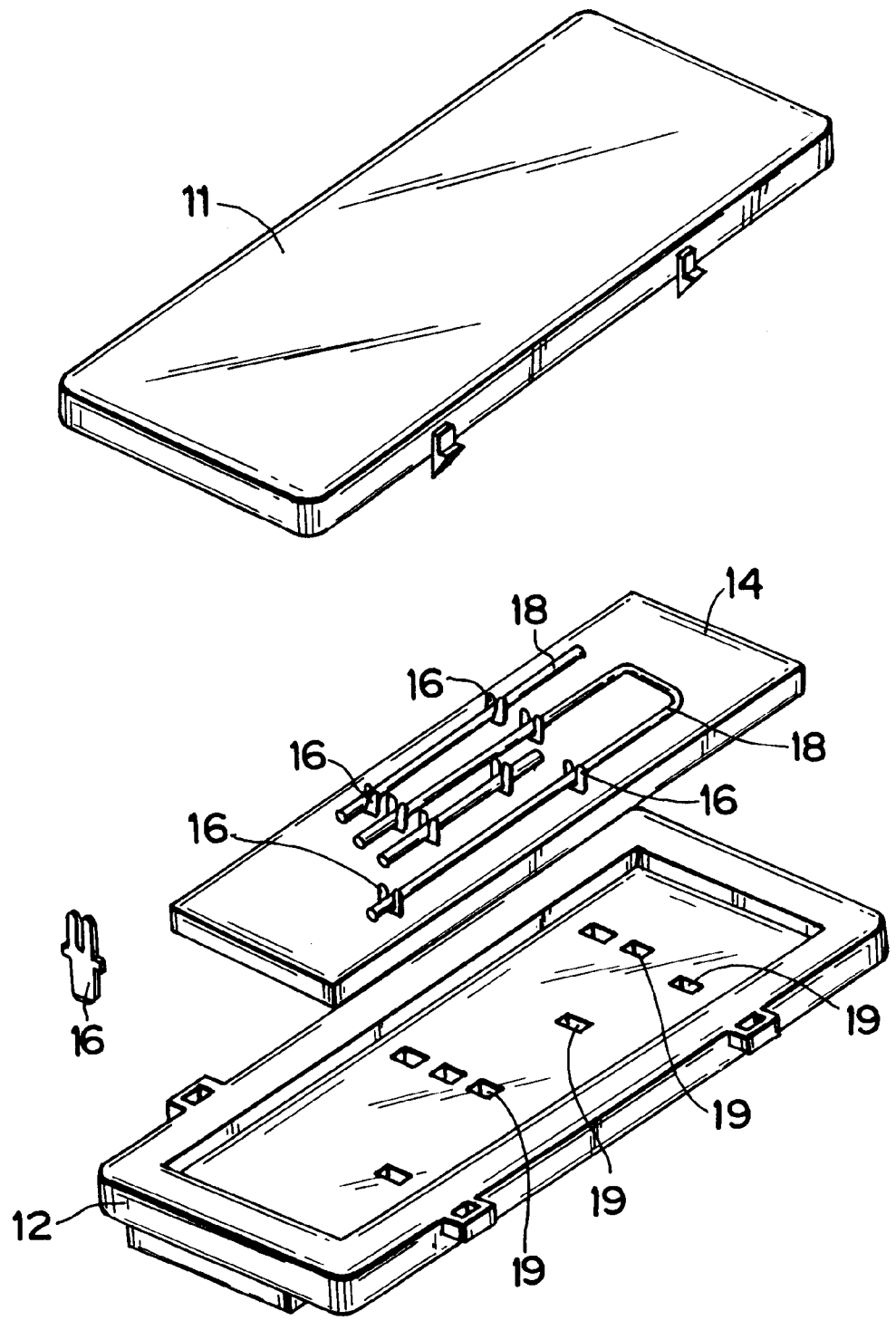
FIG. 1 is a disassembled perspective view of an electrical connection container (an electrical connection box) according to a first embodiment of the present invention.

FIG. 1 is a disassembled perspective view of an electrical connection container according to the first embodiment of the present invention. This electrical connection container is comprised of an upper case 11, a lower case 12, and an intermediate insulating plate 14 arranged between the two. The intermediate insulating plate 14 press-fit terminals 16 affixed to it. Wires 18 are press-fit and connected to these press-fit terminals 16. The lower case 12 has provided in it terminal through holes 19 through which press-fit terminals 16 are inserted and affixed.

Figure 2:
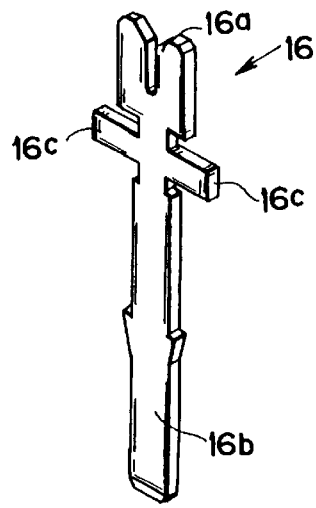
FIG. 2 is a perspective view of a press-fit terminal used for the electrical connection container illustrated in FIG. 1.

Each of the press-fit terminals 16, as shown in FIG. 2, is comprised of a press-fitting portion 16a for engaging and press-fitting a wire 18, a terminal portion 16b, and a pair of engagement projections 16c provided between the press-fitting portion 16a and terminal portion 16b.

Figure 3:
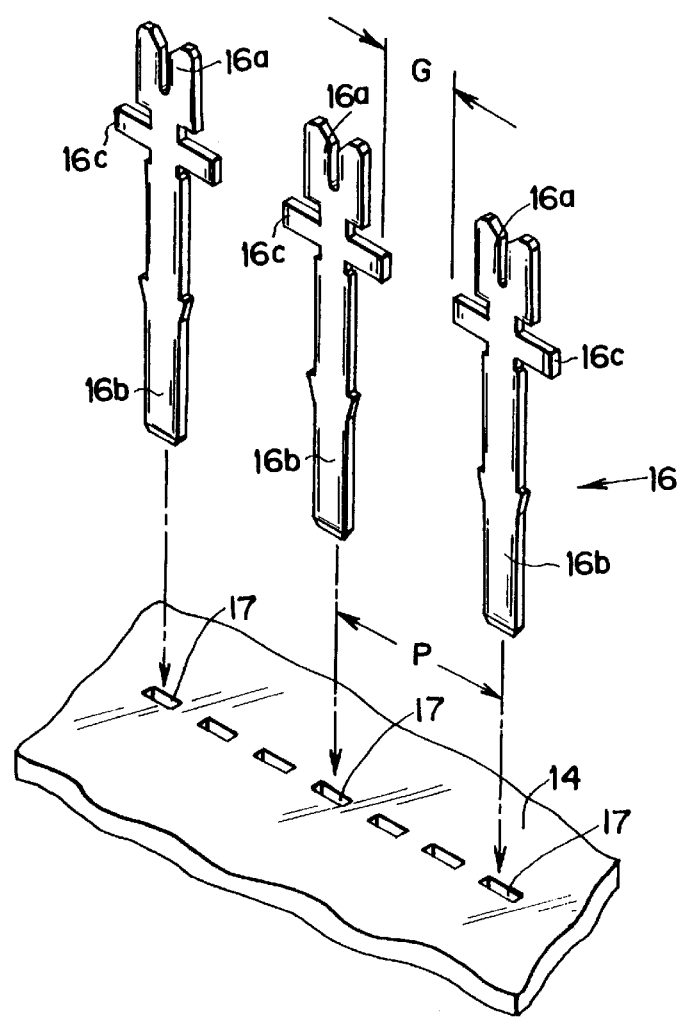
FIG. 3 is a disassembled view of a plurality of press-fit terminals provided for the electrical connection container illustrated in FIG. 1.

A plurality of the press-fit terminals 16 illustrated in FIG. 2, as shown in FIG. 3, are provided in parallel. The engagement projections 16c may be pressed down on by a tool etc. to press-fit and engage the terminal portions 16b and the engagement projections 16c in the terminal through holes 17 provided in the intermediate insulating plate 14.

As illustrated in FIG. 1, the wire 18 is press-fit to the press-fitting portions 16a of press-fit terminals 16 affixed to the intermediate insulating plate 14 by press-fitting the terminal portions 16b in the terminal through holes 17. The intermediate insulating plate 14 is sandwiched between the upper case 11 and lower case 12 to assemble the electrical connection container. After assembling the electrical connection container, opposing terminals (not shown) are connected to the terminal portions 16b projecting out from the through holes 17 of the intermediate insulating plate 14.

Points meriting improvement were found in the above-mentioned electrical connection container however. That is, when using a plurality of press-fit terminals 16 together, in the press-fit terminals 16, since the engagement projections 16c for engagement with the terminal through holes 17 of the intermediate insulating plate 14 are formed in the same plane as the plane of the press-fitting portions 16a, as illustrated in FIG. 3, the pitch P between the terminal portions 16b and 16b of the adjoining press-fit terminals 16 ends up being set by the insulating distance G between the engagement projections 16c of the press-fit terminals 16, so the pitch P between the adjoining terminals portions 16b cannot be reduced and the electrical connection container becomes large in size.

When mounting the electrical connection container in a vehicle etc., since there are limitations on the dimensions for mounting in the vehicle, enlargement of the electrical connection container should be avoided.

One method for keeping the electrical connection container from increasing in size could be to shorten the length of projection of the engagement projections 16c. If the projecting length of the engagement projections 16c is shortened, however, the engagement projections 16c will easily bite into the intermediate insulating plate 14. If the engagement projections 16c end up biting into the intermediate insulating plate 14, the new disadvantage will arise of lengths of projection of the press-fitting portions 16a and the terminal portions 16b from the intermediate insulating plate 14 differing and therefore it will not be possible to press-fit and hold the wires at the correct positions of the press-fitting portions. Further, if the lengths of projection of the engagement projections 16c are too short, it will become difficult to push in the engagement projections 16c and impossible to suitably press-fit and engage the same with the intermediate insulating plate 14. Therefore, this method cannot be adopted.

Second Embodiment

Next, as a second embodiment of an electrical connection container of the present invention, an explanation will be made of an electrical connection container overcoming some of the disadvantages of the electrical connection container of the first embodiment with reference to FIG. 1, FIG. 4, and FIG. 5.

The electrical connection container of the second embodiment of the present invention is also structured as illustrated in FIG. 1. That is, the electrical connection container of the second embodiment, like the first embodiment, is configured by the upper case 1, the lower case 12, and the intermediate insulating plate 14 therebetween as illustrated in FIG. 1.

Figure 4A:
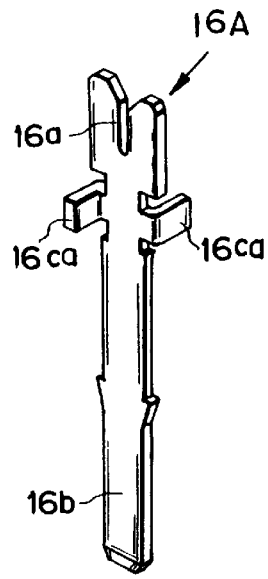
FIG. 4A to FIG. 4C are perspective views of the different examples of the press-fit terminals used in a second embodiment of the electrical connection container of the present invention.
Figure 4B:
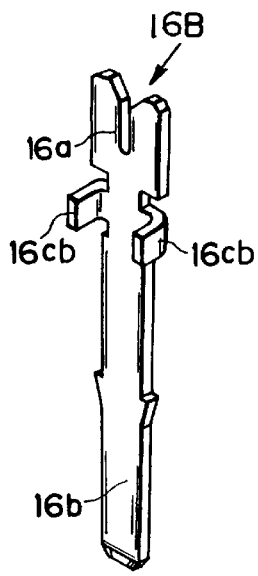
Figure 4C:
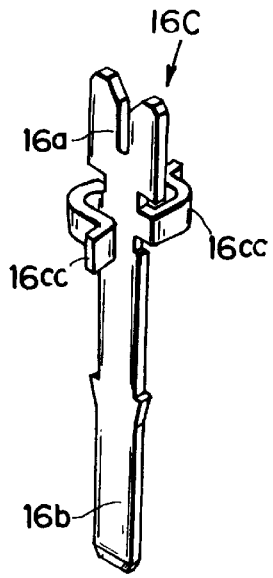
Figure 5:
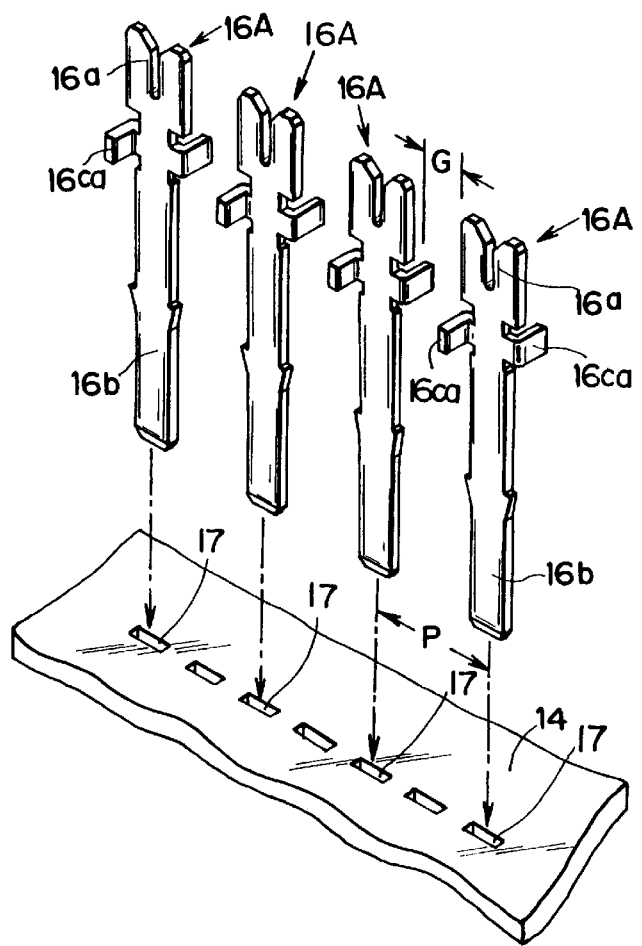
FIG. 5 is a perspective view of the arrangement of a plurality of press-fit terminals illustrated in FIG. 4A to FIG. 4C.

In the electrical connection container of the second embodiment, improvements were made in particular to the press-fit terminal as illustrated in FIG. 4 and FIG. 5.

FIG. 4A, FIG. 4B, and FIG. 4C are perspective views of different examples of the press-fit terminal used in the electrical connection container according to the second embodiment of the present invention. The press-fit terminals 16A, 16B, and 16C each have the same basic structure of the press-fitting portion 16a, the terminal portion 16b, and the pair of engagement projections 16c provided between the press-fitting portion 16a and terminal portion 16b. The direction of projection of the engagement projections 16ca to engagement projections 16cc with respect to the plane including the press-fitting portions 16a differ.

The press-fit terminal 16A illustrated in FIG. 4A has the engagement projections 16ca projecting out bent in directions perpendicular to the plane including the press-fitting portion 16a. Further, the directions of perpendicular bending of the pair of engagement projections 16ca are opposite to each other.

The press-fit terminal 16B illustrated in FIG. 4B also has the engagement projections 16cb projecting out bent in directions perpendicular to the plane including the press-fitting portion 16a. Here, however, the directions of perpendicular bending of the pair of engagement projections 16ca are the same as each other.

The press-fit terminal 16C illustrated in FIG. 4C has the engagement projections 16cc bent to a U-shape with respect to the plane including the press-fitting portion 16a, then bent at their tips perpendicularly to the plane including the press-fitting portion 16a. Further, the directions of bending of the pair of engagement projections 16cc are opposite to each other.

A plurality of the press-fit terminals 16A, 16B, and 16C of the above configurations, for example, the press-fit terminals 16A as shown in FIG. 5, are affixed to the intermediate insulating plate 14 by inserting the terminal portions 16b through the terminal through holes 17. That is, by pressing the engagement projections 16ca of the plurality of press-fit terminals 16A by a tool etc., the terminal portions 16b of the plurality of press-fit terminals 16A are press-fit and engaged with the terminal through holes 17 provided in the intermediate insulating plate 14.

When providing a plurality of press-fit terminals 16A in this way, since the plurality of press-fit terminals 16A used in the electrical connection container of the second embodiment of the present invention have the engagement projections 16ca bent in a perpendicular direction with respect to the plane including the press-fitting portion 16a, sufficient area for being pressed by a tool etc. is secured. Further, it is possible to reduce the pitch P between the terminal portions 16b and 16b of the adjoining press-fit terminals 16A while securing an insulating distance G between the engagement projections 16ca of the adjoining press-fit terminals 16A. As a result, it is possible to make the electrical connection container smaller. Further, in the case of the same size of electrical connection container, it is possible to accommodate a larger number of press-fit terminals 16A.

Note that the plurality of press-fit terminals 16A are press-fit and engaged in the terminal through holes 17 of the intermediate insulating plate 14, then the wires 18 are press-fit to the press-fitting portions 16a of the plurality of press-fit terminals 16A. This is then placed between the upper case 11 and lower case 12 and the electrical connection container assembled.

Further, after the electrical connection container is assembled, the opposing terminals (not shown) are connected to the terminal portions 16b.

The above explanation was given taking as an example the provision of a plurality of press-fit terminals 16A, but the same is true when providing a plurality of press-fit terminals 16B, when providing a plurality of press-fit terminals 16C, or when using the press-fit terminals 16A, 16B, and 16C in combination.

The engagement projections 16ca, engagement projections 16cb, and engagement projections 16cc of the press-fit terminals 16A, 16B, and 16C used in the electrical connection container of the first embodiment of the present invention may not only be provided in directions perpendicular to the plane including the press-fitting portion 16a, but may also be provided at any angle except zero with respect to the plane.

The number of the engagement projections 16ca, engagement projections 16cb, and engagement projections 16cc of the press-fit terminals 16A, 16B, and 16C may be one as well. For example, a projection may be formed round so as to surround the terminal portion 16b.

The press-fit terminals 16A, 16B, and 16C need not be affixed to the intermediate insulating plate 14 of the electrical connection container and may be also affixed to the upper case 11 or lower case 12.

Further, of course, the wiring material in the electrical connection container may include bus-bars etc. formed by punching a metal sheet in addition to the wires 18.

As explained above, the electrical connection container of the second embodiment of the present invention is provided with a plurality of press-fit terminals 16A, 16B, and 16C each comprised of a press-fitting portion 16a, a terminal portion 16b, and a pair of engagement projections 16ca, a pair of engagement projections 16cb, or a pair of engagement projections 16cc provided between the press-fitting portion 16a and terminal portion 16b. These engagement projections are provided projecting out at any angle with respect to the plane including the press-fitting portion.

By adopting this configuration, it is possible to reduce the pitch between the terminal portions 16b while securing the insulating distance between the adjoining engagement portions. Therefore, it is possible to obtain a smaller electrical connection container. Further, since there is no need to shorten the projecting length of the engagement projections, the engagement projections will not bite into the intermediate insulating plate, so it is possible to press-fit and hold the wires at the correct positions of the press-fitting portions of the press-fit terminals.

Third Embodiment

Next, an explanation will be made of the basic nature of an electrical connection container of the third embodiment of the present invention.

Figure 6:
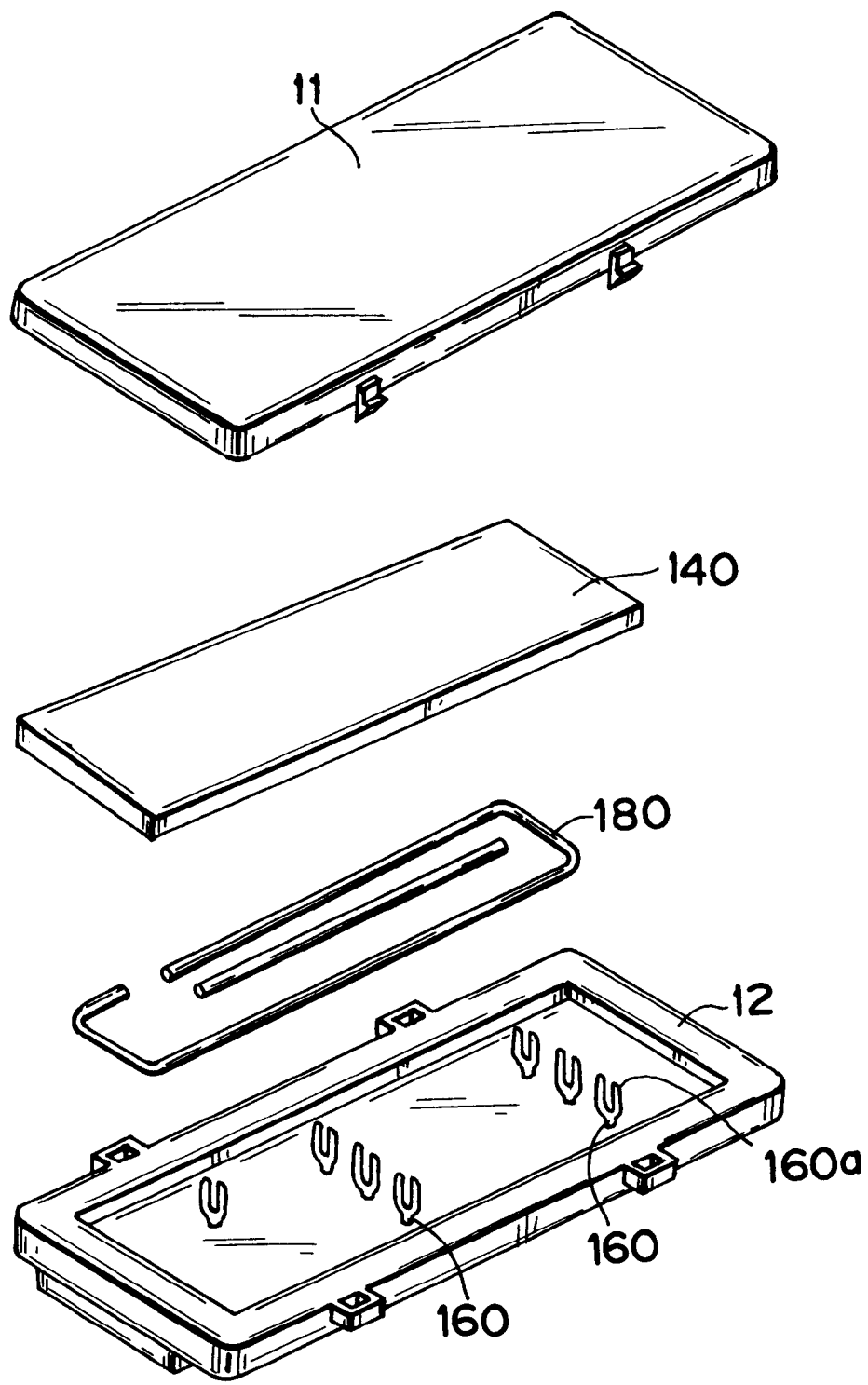
FIG. 6 is a disassembled perspective view of an electrical connection container according to a third embodiment of the present invention.

The electrical connection container illustrated in FIG. 6 is provided with an upper case 11, lower case 12, insulating subplate (intermediate insulating plate) 140, press-fit terminals 160 press-fit and engaged with the lower case 12, and wires 180 press-fit to the press-fit terminals 160. The press-fit terminals have press-fitting portions 160a for press-fitting of the wires 180.

In the electrical connection container of the above configuration, the wires 180 are arranged on the press-fitting portions 160a of the press-fitting terminals 160, the subplate 140 and the upper case 11 are successively superposed, then the upper case 11 and the lower case 12 are engaged. At this time, the subplate 140 presses against the wires 180 to press-fit the wires 180 in the press-fitting portions 160a of the press-fit terminals 160.

Figure 7:
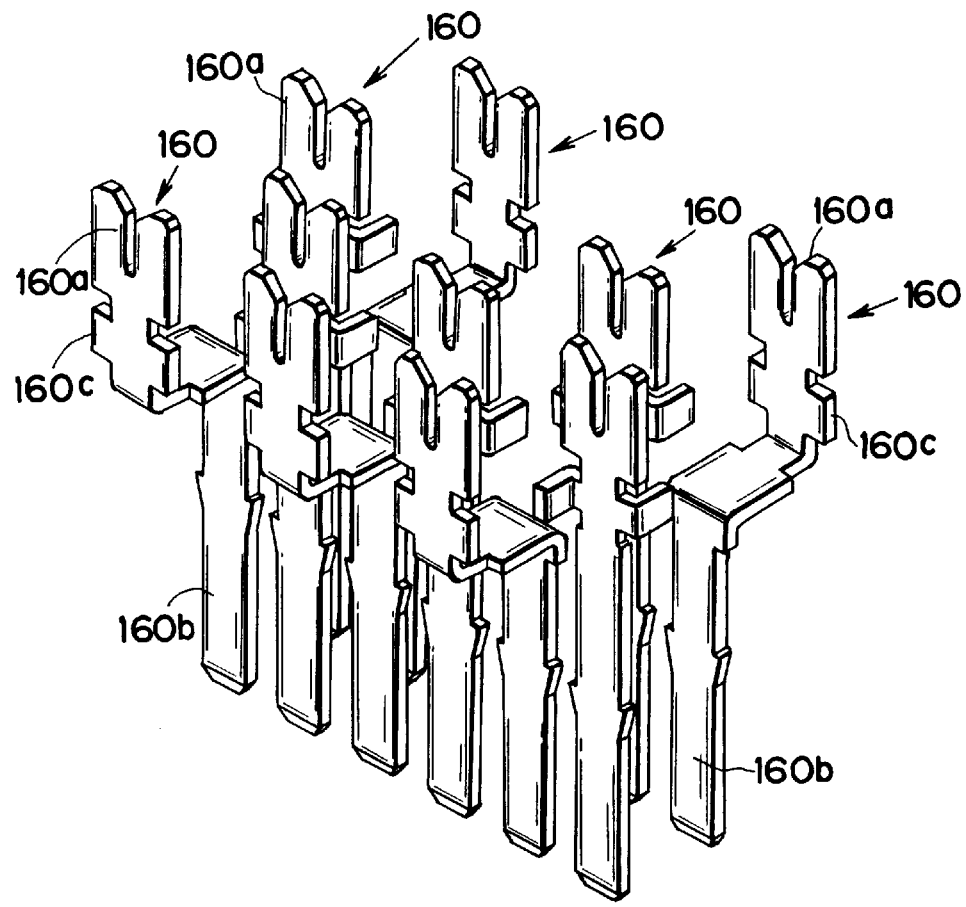
FIG. 7 is a perspective view of the arrangement of press-fit terminals in the electrical connection container illustrated in FIG. 6.
Figure 8:
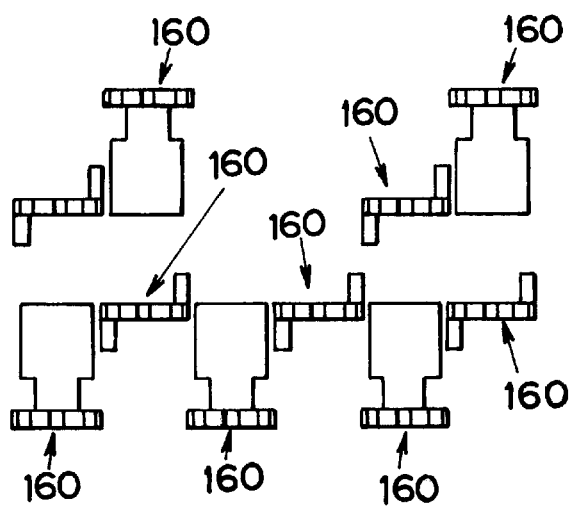
FIG. 8 is a plane view of the press-fit terminals illustrated in FIG. 7.

Recently, the number of wires laid in such electrical connection containers has increased. Along with this, the number of press-fit terminals for press-fitting of the wires has also increased. The plurality of press-fit terminals 160a are press-fit and engaged with the lower case 12 arranged in a zigzag (meander) manner in order to prevent the width of the electrical connection container becoming larger as shown in FIG. 7 and FIG. 8. That is, in the press-fit terminals 160, the terminal portions 160b project out from the bottom of the press-fitting portions 160a and are press-fit in and engaged with the lower case 12 with the press-fitting portions 160a arranged in a zigzag manner.

Figure 9:
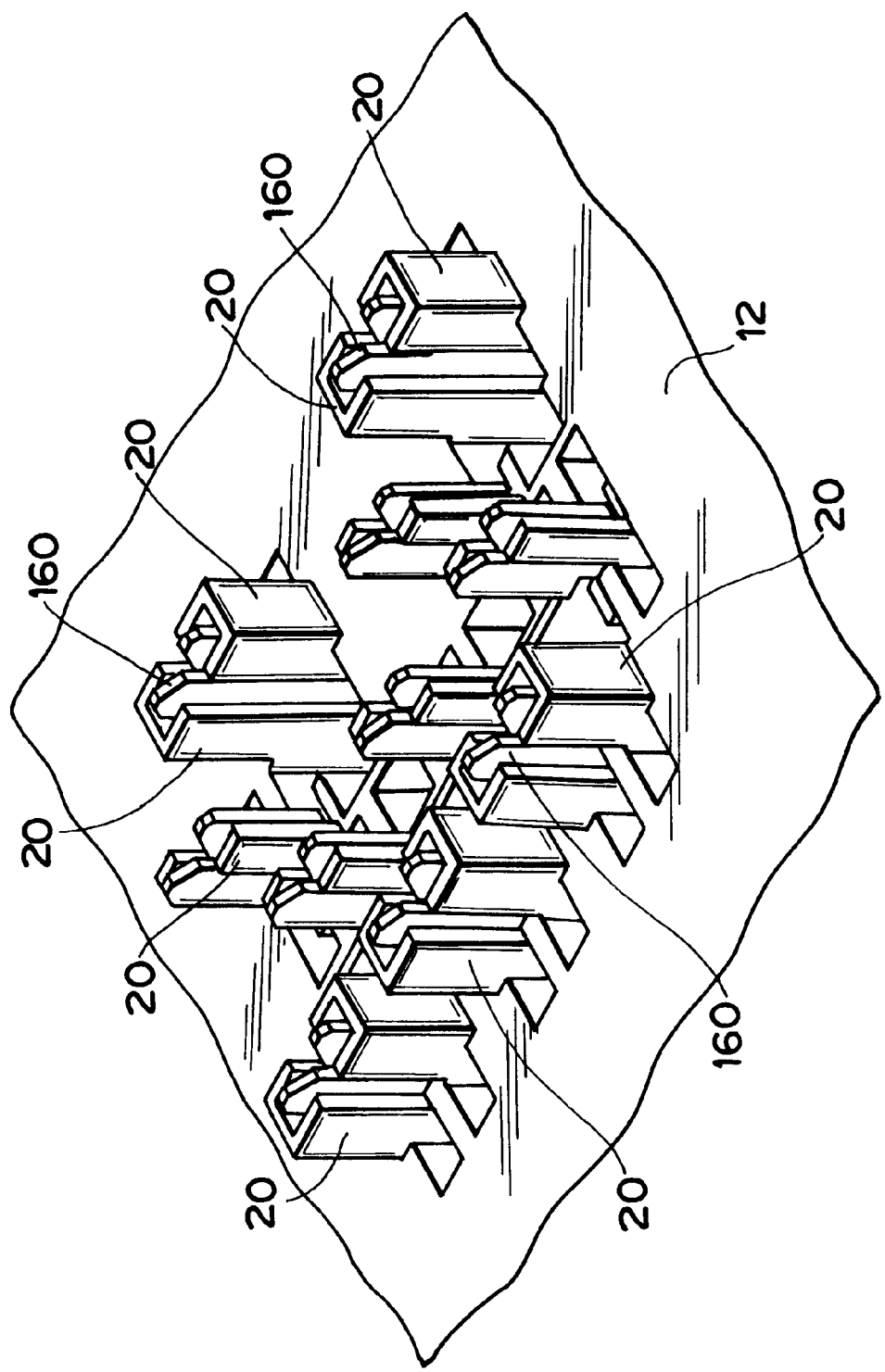
FIG. 9 is a perspective view of the state of attachment of the press-fit terminals illustrated in FIG. 7 to the electrical connection container illustrated in FIG. 6.

Further, as shown in FIG. 9, the lower case 12 is provided with protective walls 20 surrounding the press-fitting portions 160a so as to protect the press-fitting portions 160a of the press-fit terminals press-fit into and engaged with the lower case 12.

Figure 10:
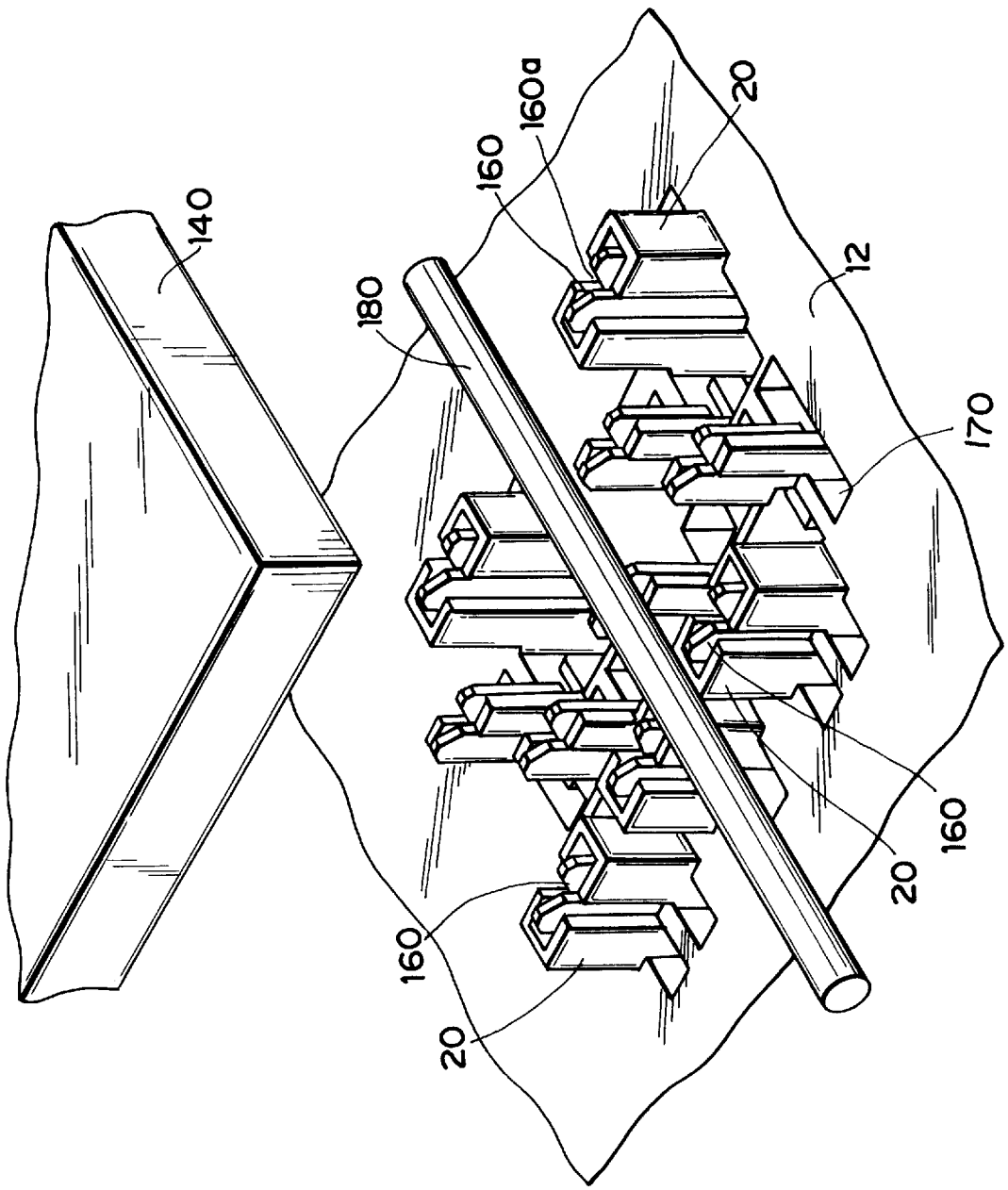
FIG. 10 is a perspective view of the state before press-fitting a wire in the press-fit terminals.

As shown in FIG. 10, a wire 180 is arranged on the press-fit portion 160a of the press-fit terminal 160 which is affixed to the lower case 12 by insertion in the terminal through hole 170. By pressing down the subplate, it is press-fit into the press-fitting portion 160a. When pressing down the subplate 140 to press-fit the wire 180 into the press-fitting portion 160a, however, sometimes the wire 180 will ride above the adjoining protective walls 20 and 20. This situation occurs since the interval between the adjoining protective walls 20 and 20 positioned in front of the press-fit terminals 160 is smaller than the diameter of the wire 180.

Figure 11:
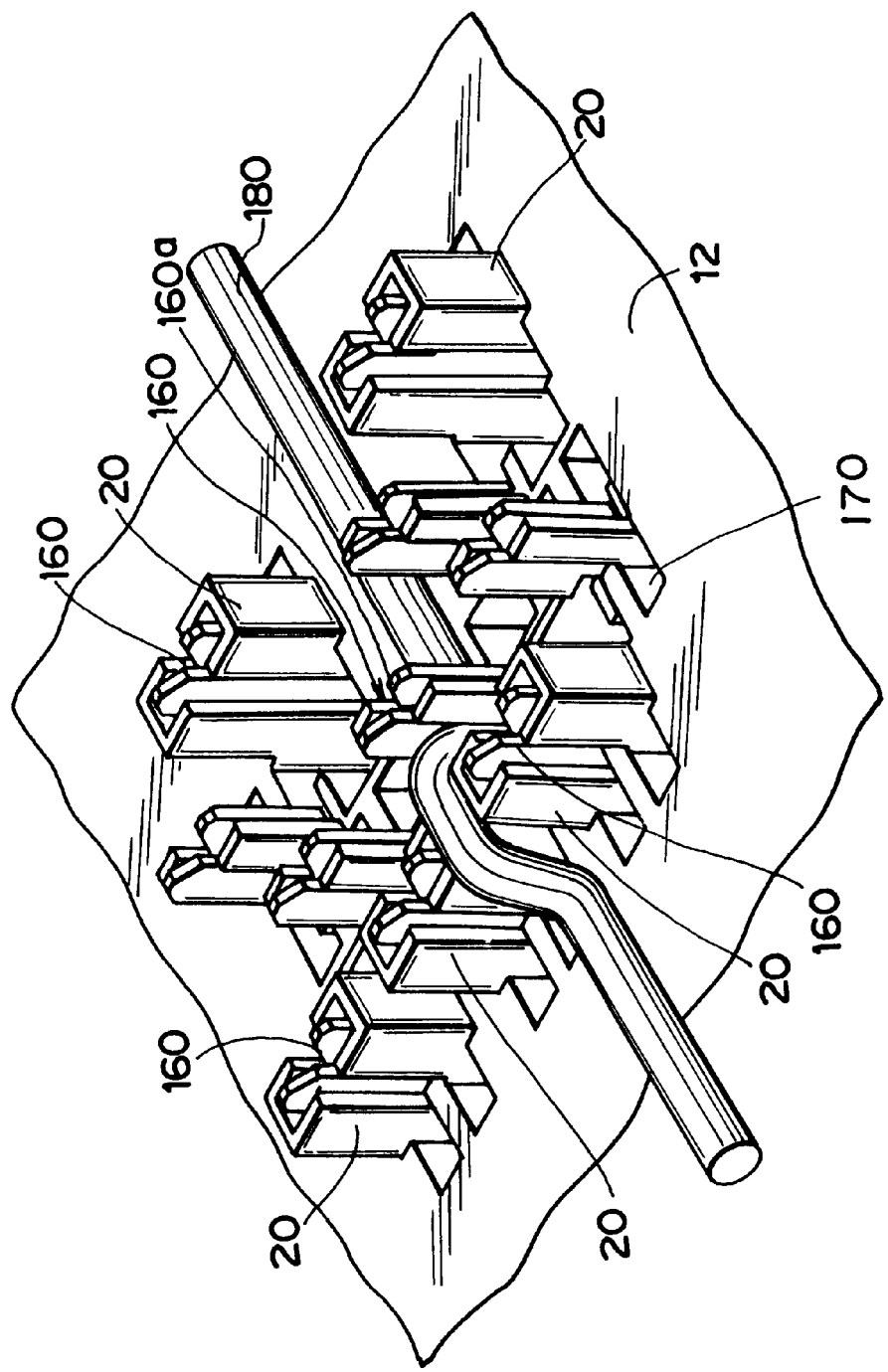
FIG. 11 is a perspective view of the state after press-fitting a wire in the press-fit terminals.

If the wire 180 rides above the adjoining protective walls 20 and 20 in this way, however, as illustrated in FIG. 11, the wire 180 will end up deviating from its correct position with respect to the press-fitting portion 160 or the wire 180 will end up connected at an angle with respect to the press-fitting portion 160a and therefore the electrical stability of the connection portion will be impaired.

Fourth Embodiment

Next, an explanation will be made of an electrical connection container of a fourth embodiment of the present invention referring to FIG. 6 and FIG. 12 to FIG. 13. The electrical connection container of the fourth embodiment of the present invention will overcome this disadvantage of the electrical connection container of the third embodiment.

The electrical connection container according to the fourth embodiment of the present invention is, like that shown in FIG. 6, comprised of an upper case 11, a lower case 12, an insulating subplate (intermediate insulating plate) 140, press-fit terminals 160 press-fit into the lower case 12 for engagement, and wires 180 press-fit in the press-fit terminals 160.

The terminal portions 160b of the press-fit terminals 160 are inserted and passed through the terminal through holes 170 of the lower case 12 and affixed by engagement of the engagement projections 160c with the terminal through holes 170.

Protective walls 20 protecting the press-fitting portions 160a of the press-fit terminals 160 are inserted into the terminal through holes along with the engagement projections 160c. Alternatively, protective walls 20 protecting the press-fitting portions 160a of the press-fit terminals 160 are formed in the case 12 at around the terminal through holes 170, and the engagement projections 160c are inserted into the terminal through holes 170 and the press-fitting portions 160a are protected by the protective walls 20.

Figure 12:
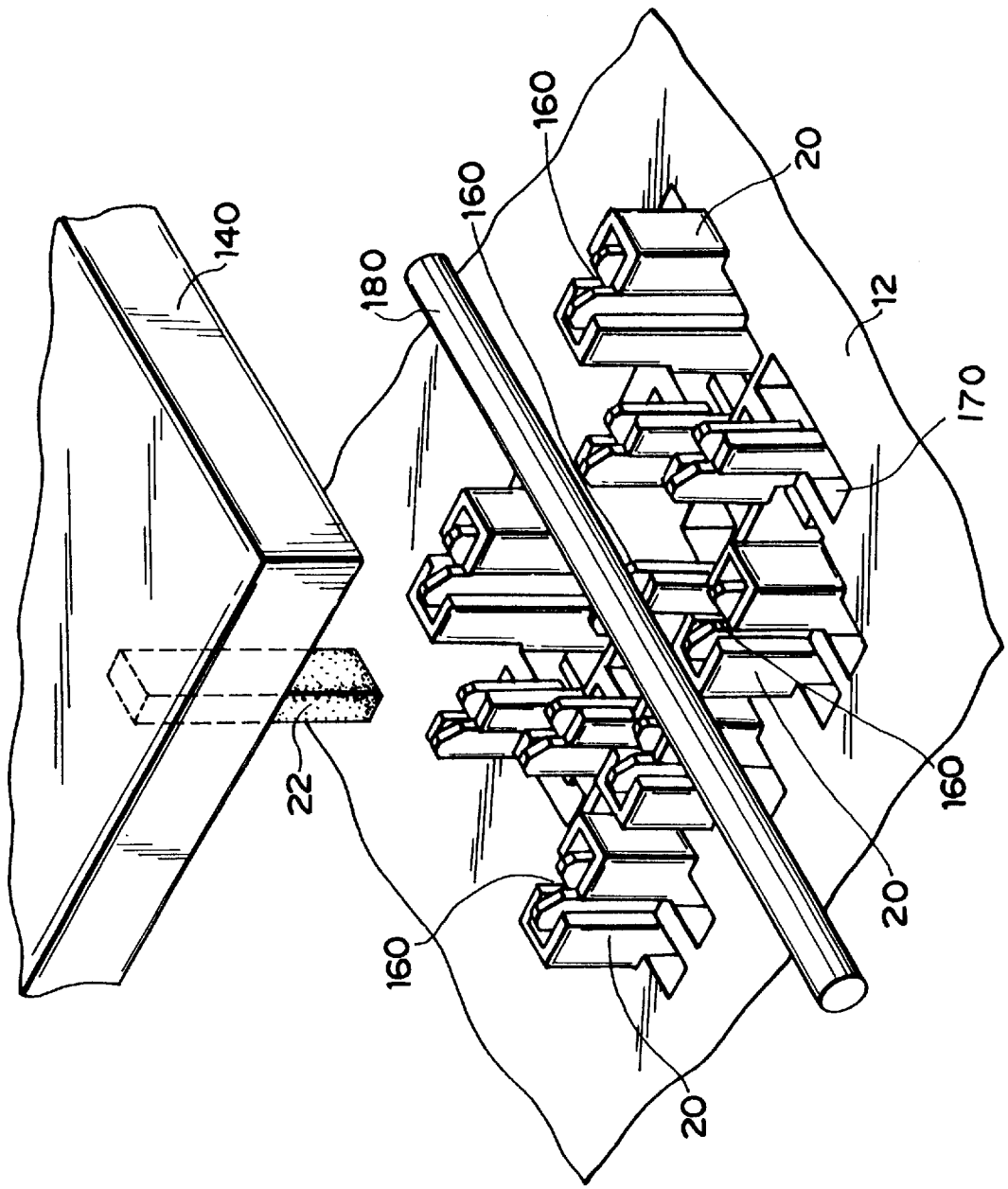
FIG. 12 is a perspective view of key portions of the electrical connection container according to a fourth embodiment of the present invention.

In the fourth embodiment of the present invention, as shown in FIG. 12, wire pressing ribs 22 are provided projecting out from the bottom surface of the subplate 140. These wire pressing ribs 22 are formed at positions which enable them to press-fit the wires 180, in a state riding above the space between the protective walls 20, into the press-fitting portions 160a of the press-fit terminals 160 at the corresponding positions and push them into the space between the adjoining protective walls 20. They are formed to lengths enabling the wires to be made substantially linear when the wires are press-fit into the press-fitting portions.

In the electrical connection container of the above configuration, to press-fit the wires 180 to the press-fitting portions 160a of the press-fit terminals 160, the wires 180 are laid over the press-fitting portions 160a (FIG. 7) of the press-fit terminals 160, the subplate 140 and the upper case 11 are successively superposed, and the upper case 11 and lower case 14 are engaged. When doing this, the subplate 140 presses the wires 180 to press-fit the wires 180 into the press-fitting portions 160a of the press-fit terminals 160. When the subplate 140 presses the wires 180 to press-fit the wires 180 into the press-fitting portions 160a of the press-fit terminals 160, the wire pressing ribs 22 provided projecting from the bottom surface of the subplate 140 push down the wires 180 riding above the spaces between the adjoining protective walls 20 into the spaces between the adjoining protective walls 20 and keep the wires 180 substantially straight.

Figure 13:
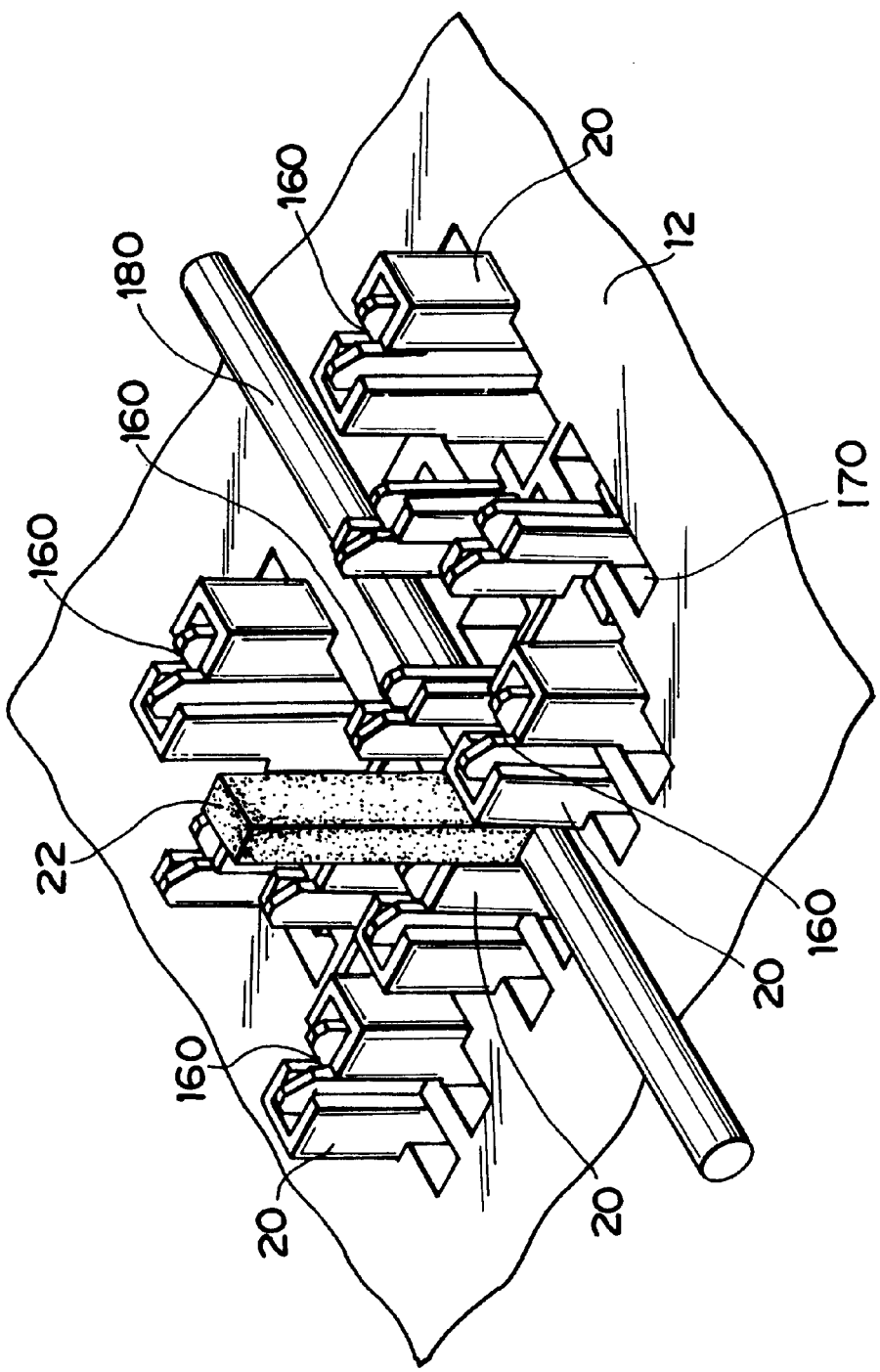
FIG. 13 is a perspective view of the state at the end of the press-fitting work in the electrical connection container illustrated in FIG. 12.

The wire pressing ribs 22 press-fit the wires 180 into the press-fitting portions 160a of the press-fit terminals 160, then, as shown in FIG. 13, are kept in a state keeping down the wires 180 pushed between the adjoining protective walls 20. Therefore, the wires 180 press-fit into the wire press-fit portions 160a of the press-fit terminals 160 are resistant to vibration and the reliability of the connection portion can be improved.

Note that in the above fourth embodiment, the explanation was made with reference to the provision of the wire pressing ribs 22 on the subplate 140, but the wire pressing ribs may be any which press-fits the wires to the press-fitting portions of the press-fitting terminals 160 and for example may be provided on the upper case 11, lower case 12, etc. as well.

Further, in the fourth embodiment, the explanation was made of the case of pushing the wires 180, riding above the space between adjoining protective walls 20, into the spaces between the adjoining protective walls 20, but the present invention may also be applied to wires 180 riding above other places besides the spaces between adjoining protective walls 20.

The electrical connection container of the fourth embodiment of the present invention overcomes the above disadvantages. It is configured by press-fit terminals 160 having press-fitting portions 160a, wires 180 press-fit to the wire press-fit portions of the press-fit terminals 160, and wire pressing ribs 22 for pressing the wires 180 which end up riding above the area near press-fit terminals 160 and keeping them substantially straight.

As explained above, when press-fitting the wires 180 to the press-fitting portions 160a of the press-fit terminals 160, if the wire pressing ribs are provided for pressing the wires 180 and keeping the wires substantially straight, it is possible to press-fit wires 180 which end up riding above the area near press-fit terminals 160 to wire press-fit portions of the press-fit terminals while kept substantially straight. That is, the wires riding above the spaces between the protective walls 20 and 20 are pressed by the wire pressing ribs 22, pushed into the spaces between the adjoining protective walls 20 and 20, and kept substantially straight. If press-fit to the press-fitting portions 160a of press-fit terminals 160 while keeping the wires straight, it is possible to press-fit the wires 180 to the press-fitting portions 160a at the correct connection position and possible to press-fit wires 180 to the press-fitting portions 160a in a crossed state. Accordingly, it is possible to obtain an electrically stable state of connection between the press-fitting portions 160a and the wires 180. The protective walls 20 protecting the press-fitting portions 160a of the press-fit terminals 160 may be provided to the subplate 140, and the press-fit terminals 160 are fixed to the subplate 140 to press-fit the wire 180 at the press-fitting portions 160a of the press-fit terminal 160.

Fifth Embodiment

Next, an electrical connection container according to a fifth embodiment of the present invention will be explained with reference to FIG. 14 to FIG. 15.

Recently, electrical connection containers using wires as wiring have been proposed. In the electrical connection container, the circuit is configured by press-fitting the wires to the press-fitting portions of the press-fit terminals.

Figure 14:
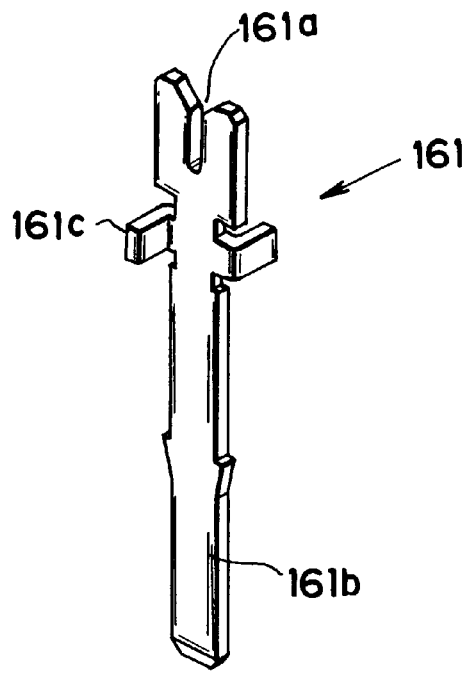
FIG. 14 is a perspective view of the press-fit terminal used in the electrical connection container according to a fifth embodiment of the present invention.
Figure 15:
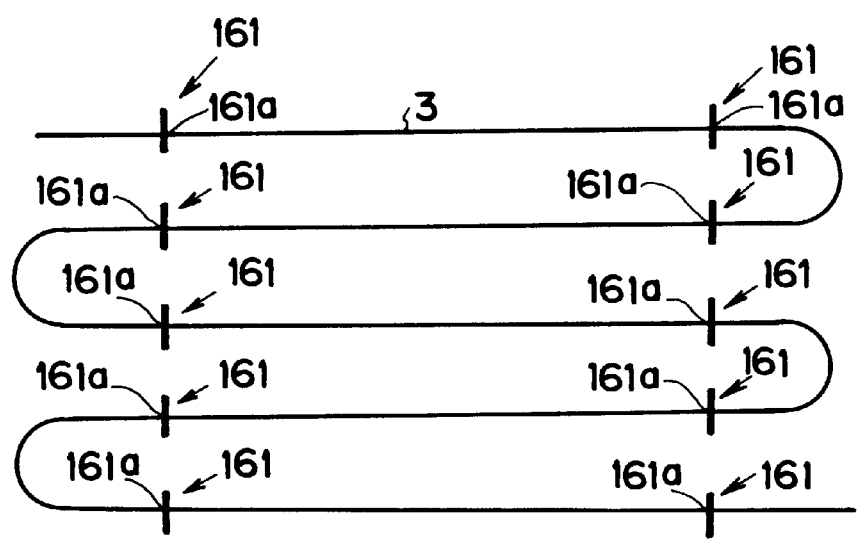
FIG. 15 is a view of a method of press-fitting and laying a wire at the press-fitting portions in the electrical connection container illustrated in FIG. 14.
Figure 16:
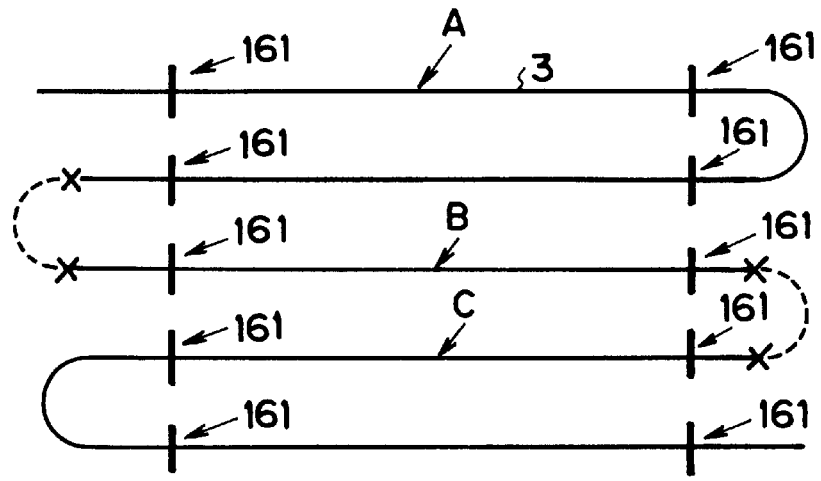
FIG. 16 is a schematic plane view of the method of laying a wire shown in FIG. 15.

To produce the electrical connection container in this way, first the press-fit terminals 161 comprised of the press-fitting portions 161a and terminal portions 161b as shown in FIG. 14 are affixed by engagement with the case of the electrical connection container (lower case 12 illustrated in FIG. 10 and FIG. 12), the insulating plate (intermediate insulating plate 14 illustrated in FIG. 1 and FIG. 5), etc. Next, as shown in FIG. 15, a single wire 3 is laid and the single wire is press-fit to the press-fitting portions 161a of the press-fitting terminals 161. Finally, the wire 3 is cut at predetermined locations to form predetermined circuits A, B, and C.

In the method of laying a single wire 3, press-fitting the wire 3 in the press-fitting portions 161a of the press-fit terminals 161, then cutting the wire 3 at predetermined locations to form the predetermined circuits A, B, and C, however, it suffers from the disadvantages of scraps of the wires 3 remaining in the case or at the insulating plate etc. when cutting the wire 3 and of the need for processes or facilities for removing the same. Further, it suffers from the disadvantage of the uneconomical use of the wire 3 due to the large amount of scrap produced.

Sixth Embodiment

Next, an explanation will be made of an electrical connection container according to a sixth embodiment of the present invention referring to FIG. 17 to FIG. 19.

The electrical connection container of the sixth embodiment helps solve the above disadvantages of the electrical connection container of the fifth embodiment.

Figure 17:
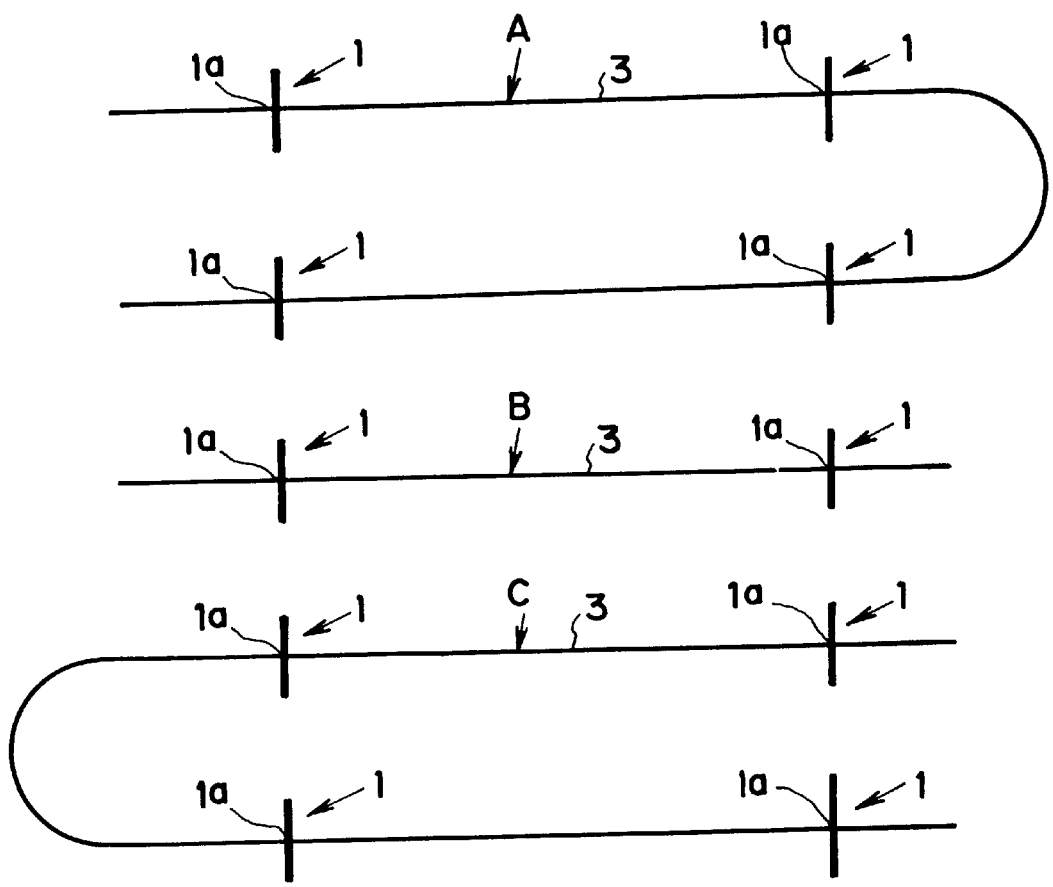
FIG. 17 is a view of the method of laying a wire in an electrical connection container illustrated in FIG. 16 according to a sixth embodiment of the present invention.

FIG. 17 is a schematic plane view of an electrical connection container of the sixth embodiment of the present invention.

The sixth embodiment is the same as the above fifth embodiment in that the wire 3 is press-fit to the wire press-fit portions 1a of the press-fit terminals 1, but the wire 3 in the sixth embodiment is cut into lengths for the circuits A, B, and C and then laid. That is, in the circuit A, the wire 3 is cut to the length necessary for forming the circuit A and is laid press-fit to four press-fit terminals 1. In the circuit B, the wire 3 is cut to the length necessary for forming the circuit B and is laid press-fit to two press-fit terminals 1. In the circuit C, the wire 3 is cut to the length necessary for forming the circuit C and is laid press-fit to four press-fit terminals 1.

Figure 18A:
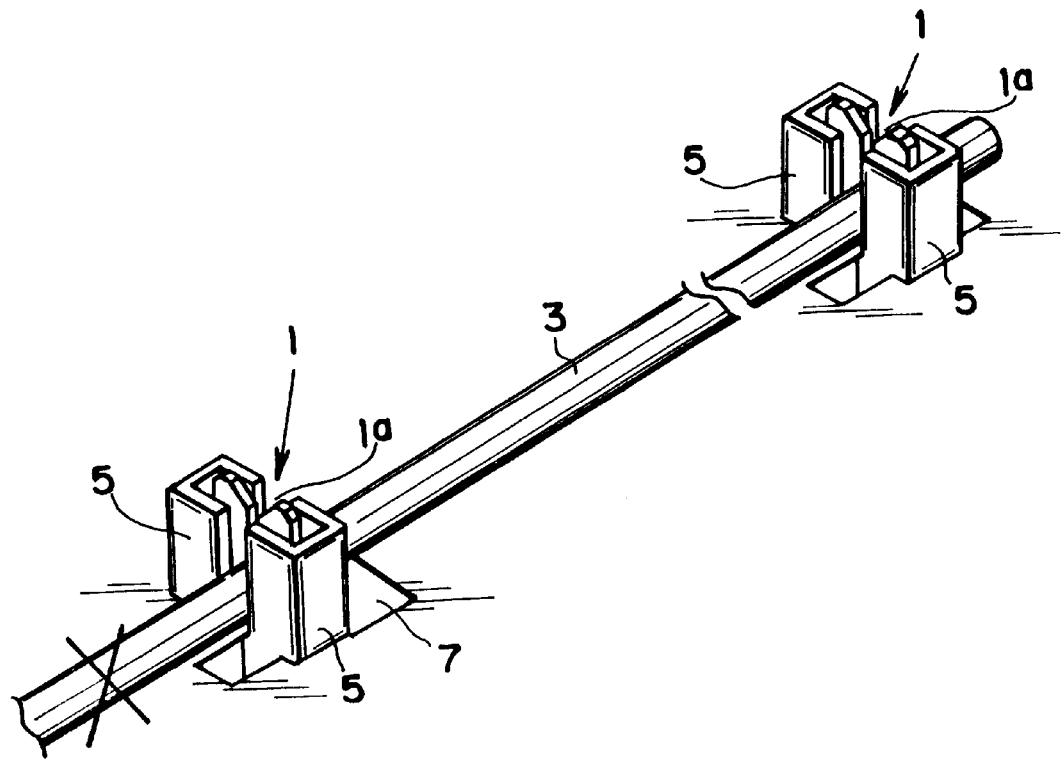
FIG. 18A and FIG. 18B are views of the method of press-fitting and laying a wire in the press-fitting portions of the electrical connection container illustrated in FIG. 17 as a first example of the sixth embodiment of the present invention, where
Figure 18B:
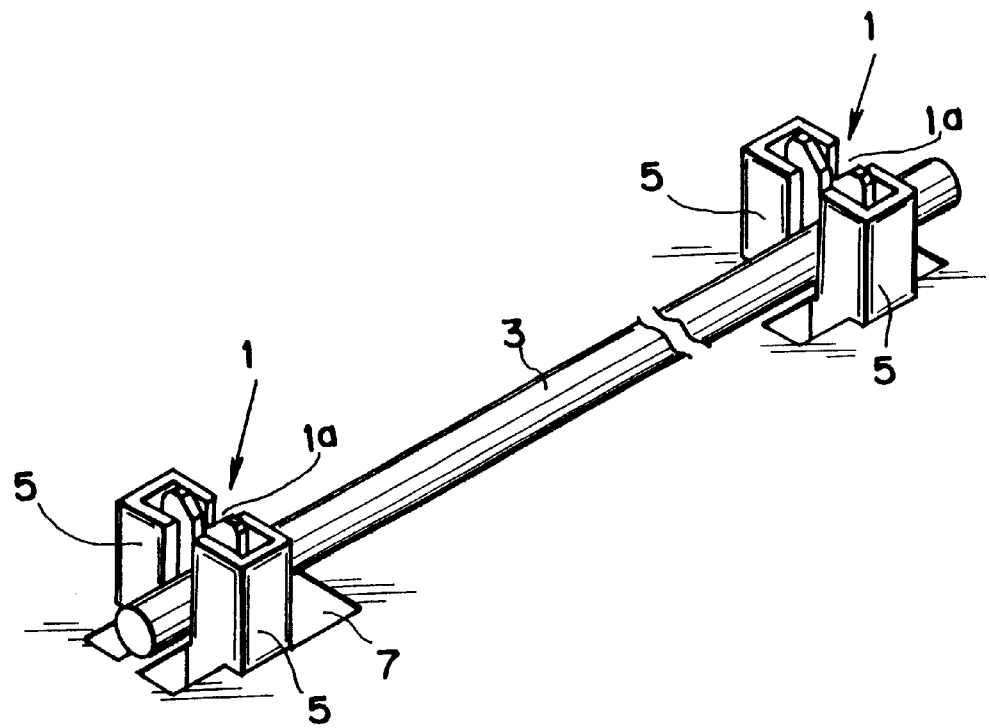
Figure 19A:
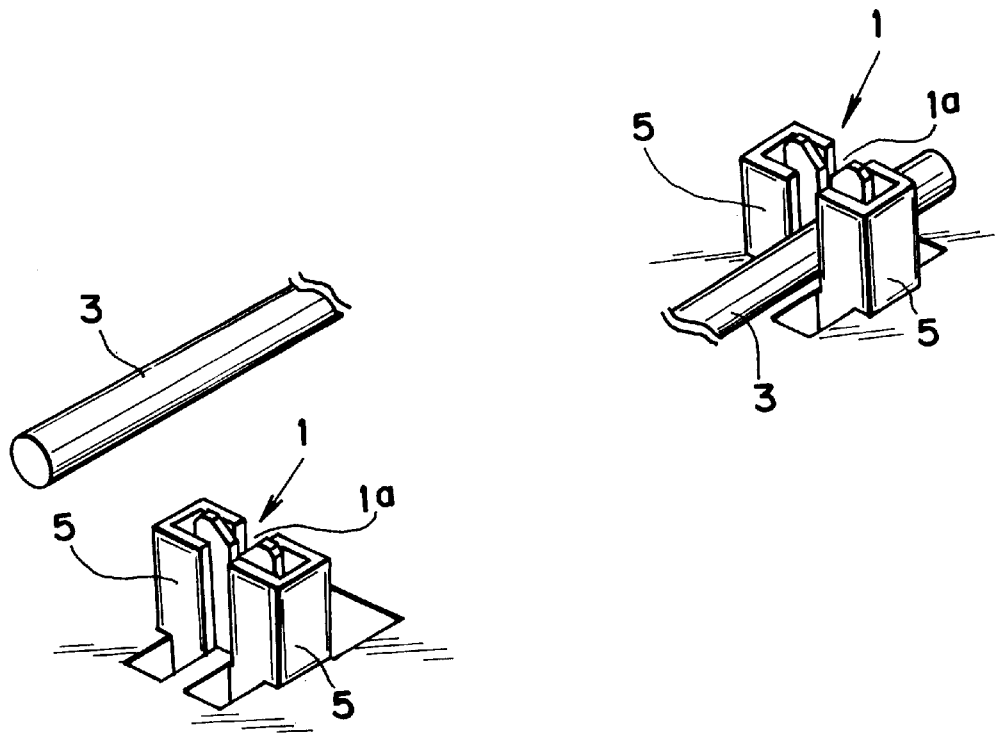
Figure 19B:
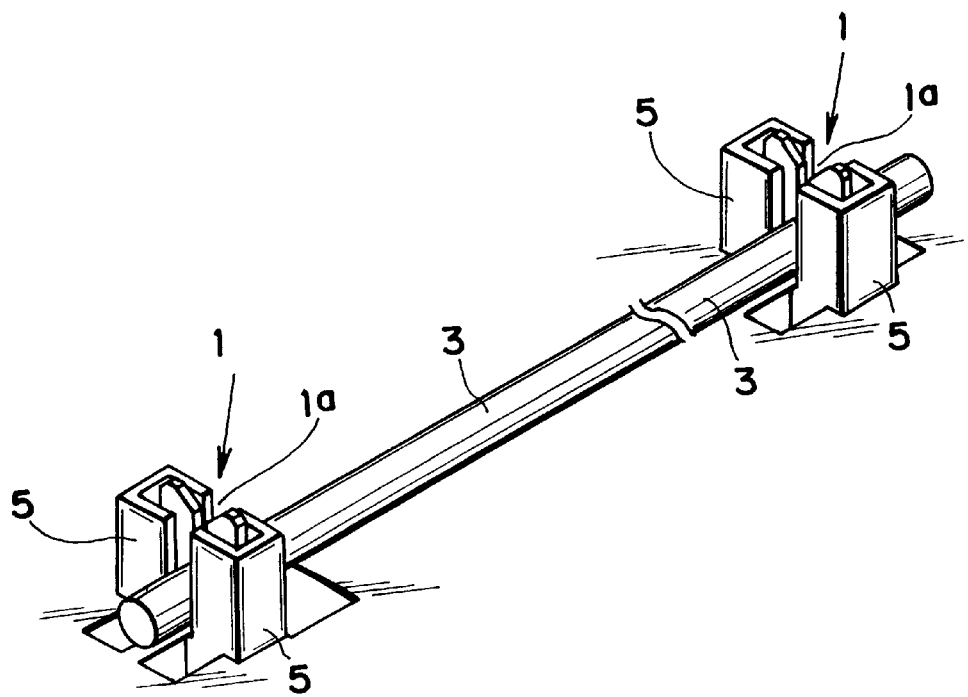

To form the above electrical connection container, the wires 3 cut into predetermined lengths for forming the circuits A, B, and C are prepared in advance and then press-fit to the press-fitting portions 1a of the press-fit terminals 1. As shown in FIG. 18A and FIG. 18B, a length of the wire 3 is taken and successively press-fit to the press-fit terminals 1 of the circuit A, then the wire 3 is cut after press-fitting the wire at the position of the last press-fit terminal 1 of the circuit A. Alternatively, as shown in FIG. 19A and FIG. 19B, a length of the wire 3 is taken and successively press-fit to the press-fit terminals 1 of the circuit A, the wire 3 is cut before press-fitting the wire at the position of the last press-fit terminal 1 of the circuit A, then suitably thereafter the wire 3 is press-fit to the last press-fit terminal 1.

After the wire finishes being laid for the circuit A, wires 3 cut in advance to predetermined lengths or successively cut wires are press-fit into the press-fit terminals for the circuit B and the circuit C in the same way.

Note that in FIG. 18A, FIG. 18B, FIG. 19A, and FIG. 19B, reference numeral 5 shows a protective wall formed around the wire press-fit portion 1a for protecting the press-fitting portion 1a of the press-fit terminal 1.

Further, reference numeral 7 shows a terminal through hole formed in the plate. Like the terminal through holes 17 illustrated in FIG. 5 and the terminal through holes 170 illustrated in FIG. 13, this hole is for engagement with and affixing of the protective walls 5 protecting the press-fitting portion 1a of the press-fit terminal 1.

The electrical connection container of the sixth embodiment of the present invention is provided with press-fit terminals having press-fitting portions and wires press-fit to the press-fitting portions of the press-fit terminals and is characterized in that the wires which are press-fit to the press-fitting portions of the press-fit terminals are laid after being cut for each circuit.

If the wires are laid after being cut for each circuit in this way, no scraps of wires are generated, so processes and facilities for removing them become unnecessary and there is no waste of the wires which is advantageous in terms of costs.

Note that the circuits of the electrical connection container of the present invention may be of any configuration. The number and arrangement of the press-fit terminals is not particularly limited.

We claim:

1. An electrical connection container comprising:
   an insulating plate having terminal through holes; and
   a press-fit terminal,
   said press-fit terminal having
   a press-fitting portion for press-fitting and affixing thereto a wire laid along the surface of the insulating plate,
   a terminal portion for insertion through a terminal through hole in the insulating plate, said press-fitting portion and said terminal portion being arranged in the same plane, and
   a projection formed between the press-fitting portion and the terminal portion, projecting in a plane different from the plane of the press-fitting portion and the terminal portion,
   the terminal portion passing through the terminal through hole, and
   the projection stopping the passing of the press-fit terminal through the terminal through hole to engage the press-fit terminal with the insulating plate,
   the press-fitting portion, the projection and the terminal portion being formed integrally and continuously by a single electrical-conductive plate.

2. An electrical connection container as set forth in claim 1, further comprising an upper case and lower case accommodating the insulating plate with the press-fit terminals therebetween.

3. An electrical connection container as set forth in claim 1, further comprising an upper case and a lower case accommodating therebetween the insulating plate having the press-fit terminals.

4. An electrical connection container as set forth in claim 3, wherein the engagement projection of the press-fit terminal is bent into a plane substantially perpendicular to the plane of the press-fitting portion.

5. An electrical connection container as set forth in claim 4, wherein a pair of the engagement projections of the press-fit terminal is provided at opposite positions at the two sides of each of the press-fitting portions and the engagement projections of the pair are bent in opposite directions.

6. An electrical connection container as set forth in claim 4, wherein a pair of the engagement projections of the press-fit terminal is provided at opposite positions at the two sides of each of the press-fitting portions and the engagement projections of the pair are bent in the same direction.

7. An electrical connection container as set forth in claim 4, wherein
   a pair of engagement projections of the press-fit terminals are provided at opposite positions at the two sides of each of the press-fitting portions,
   each of the pair of the engagement projections is comprised of a first portion bent into a plane substantially perpendicular to the plane of the press-fitting portion, a second portion extending from the first portion and bent to be substantially perpendicular to the first portion and parallel to the plane of the press-fitting portion, and a third portion extending from the second portion and bent to be substantially parallel to the first portion, and
   each of the pair of the engagement projections is provided at opposite sides with respect to the plane of the press-fitting portion.

8. An electrical connection container comprising:
   a press-fit terminal having a press-fitting portion for press-fitting a wire laid along the surface of a plate,
   a terminal through hole formed in the plate for insertion and affixing of the press-fit terminal, and
   a subplate pressed from one side of the plate for press-fitting the wire in the press-fitting portion,
   said subplate comprising a wire pressing rib for press-fitting and continuing to press the wire against the press-fitting portion,
   wherein the wire pressing rib is arranged on the subplate so as to press-fit the wire against the press-fitting portion and to be positioned in areas free of the press-fit terminal on portions of the wire where the wire is not press-fit.

9. An electrical connection container as set forth in claim 8, wherein the press-fitting terminal has
   a press-fitting portion for press-fitting a wire,
   an engagement projection formed continuous with the press-fitting portion, and
   a terminal portion formed continuous with the engagement projection, and the terminal portion is passed through the terminal through hole and the engagement projection stops the passing of the press-fit terminal through the terminal through hole to engage the press-fit terminal with the insulating plate.

10. An electrical connection container as set forth in claim 8, wherein
    the plate is provided between an upper case and a lower case,
    a protective wall protecting the press-fitting portion of the press-fit terminal is provided on the plate, and
    the press-fit terminal is fixed to the plate to press-fit the wire in the press-fitting portion of the press-fit terminal.

11. An electrical connection container as set forth in claim 8, wherein
    the plate is formed as a lower case, and
    the container further comprises an upper case which cooperates with the lower case to accommodate the subplate having the wire pressing rib.

12. An electrical connection container as set forth in claim 9, wherein the engagement projection and the terminal portion have between them an intermediate connection portion bent substantially perpendicular to said terminal portion.

13. An electrical connection container as set forth in claim 12, wherein a protective wall protecting the press-fitting portion of the press-fit terminal is inserted into the terminal through hole along with the engagement projection.

14. An electrical connection container as set forth in claim 12, wherein a protective wall protecting the press-fitting portion of the press-fit terminal is formed in the plate around the terminal through hole, and the engagement projection is inserted into the terminal through hole and the press-fitting portion is protected by the protective wall.

15. A method for laying a wire in an electrical connection container having a plate for laying the wire, a plurality of terminal through holes formed in a row in the plate, and a plurality of press-fit terminals comprising a terminal portion projecting through the terminal through hole, an engagement projection stopping the passing of the press-fit terminal through the terminal through hole to engage the press-fit terminal with the insulating plate, and a press-fitting portion connected to the engagement projection and positioned at a surface of the plate opposite to that of the terminal portion, comprising the steps of:

for every circuit to be formed in the electrical connection container, cutting in advance a wire into a predetermined length in accordance with the positions of the plurality of press-fitting portions of the press-fit terminals affixed to the terminal through holes, and press-fitting the predetermined length of the wire in the plurality of press-fitting portions.

16. A press-fit terminal for an electrical connection container comprising:

a press-fitting portion for press-fitting and affixing a wire laid along the surface of a plate of the electrical connection container, a terminal portion for passing through a terminal through hole formed in the plate, said press-fitting portion and said terminal portion being arranged in the same plane, and a projection formed between the press-fitting portion and the terminal portion, projecting in a plane different from the plane of the press-fitting portion and the terminal portion, the press-fitting portion, the projection and the terminal portion being formed integrally and continuously by a single electrical-conductive plate.

17. A press-fit terminal for an electrical connection container as set forth in claim 16, wherein the engagement projection is bent into a plane substantially perpendicular to the plane of the press-fitting portion.

18. A press-fit terminal for an electrical connection container as set forth in claim 16, wherein a pair of the engagement projections is provided at opposite positions at the two sides of the press-fitting portion and the engagement projections of the pair are bent in opposite directions.

19. A press-fit terminal for an electrical connection container as set forth in claim 16, wherein a pair of the engagement projections is provided at opposite positions at the two sides of the press-fitting portion; and the engagement projections of the pair are bent in the same direction.

20. A press-fit terminal for an electrical connection container as set forth in claim 16, wherein a pair of engagement projections is provided at opposite positions at the two sides of the press-fitting portion, each of the pair of the engagement projections comprising a first portion bent into a plane substantially perpendicular to the plane of the press-fitting portion, a second portion extending from the first portion and bent to be substantially perpendicular to the first portion and parallel to the plane of the press-fitting portion, and a third portion extending from the second portion and bent to be substantially parallel to the first portion, and each of the pair of the engagement projections is provided at opposite sides with respect to the plane of the press-fitting portion.

21. A press-fit terminal for an electrical connection container as set forth in claim 16, wherein the engagement projection and the terminal portion have between them an intermediate connection portion bent substantially perpendicular to the terminal portion.

* * * * *